United States Patent [19]

Atkins

[11] Patent Number: 4,790,607
[45] Date of Patent: Dec. 13, 1988

[54] VEHICLE ANTI-LOCK BRAKE SYSTEM
[75] Inventor: Thomas M. Atkins, Ann Arbor, Mich.
[73] Assignee: Kelsey Hayes Company, Romulus, Mich.
[21] Appl. No.: 63,361
[22] Filed: Jun. 15, 1987

Related U.S. Application Data

[63] Continuation-in-part of Ser. No. 702,765, Feb. 19, 1985, Pat. No. 4,673,226.
[51] Int. Cl.$^4$ .............................................. B60T 8/66
[52] U.S. Cl. .................................. 303/109; 188/181 D; 303/97; 303/106; 303/100; 303/119; 303/61; 303/68; 303/DIG. 4; 303/110; 364/426.02
[58] Field of Search .................................. 303/95–110, 303/61, 113–119, DIG. 4, 91–119, DIG. 1–4, 61–63, 68–69, 2–3, 9.62, 9.73; 188/181, 349; 364/426; 251/129.11–129.22; 180/197, 244; 335/277

[56] References Cited

U.S. PATENT DOCUMENTS

| | | | |
|---|---|---|---|
| 3,514,160 | 5/1970 | Leiber .................................. | 303/119 |
| 3,515,440 | 6/1970 | Every et al. ........................ | 303/115 |
| 3,521,934 | 7/1970 | Leiber .................................. | 303/119 |
| 3,540,780 | 11/1970 | Okamoto et al. ................... | 303/106 |
| 3,550,966 | 12/1970 | Leiber .................................. | 303/119 |
| 3,617,098 | 11/1971 | Leiber .................................. | 303/119 |
| 3,630,579 | 12/1971 | Rodi .................................... | 188/181 A |
| 3,731,979 | 5/1973 | Mikaila ............................... | 303/DIG. 4 |
| 3,761,140 | 9/1973 | Lewis et al. ........................ | 303/114 |
| 3,850,480 | 11/1974 | Atkins ................................ | 303/106 |
| 3,857,613 | 12/1974 | Arikawa .............................. | 303/109 |
| 3,870,376 | 3/1975 | Riordan .............................. | 303/92 |
| 3,880,474 | 4/1975 | Scharlack .......................... | 303/106 X |
| 3,953,080 | 4/1976 | Bremer .............................. | 303/106 |
| 3,975,060 | 8/1976 | Hirayama ........................... | 188/349 X |
| 3,981,543 | 9/1976 | Atkins ................................ | 303/115 X |
| 4,036,537 | 7/1977 | Fleagle .............................. | 303/106 |
| 4,073,542 | 2/1978 | Yabuta et al. .................... | 188/349 X |
| 4,077,675 | 3/1978 | Leiber et al. ...................... | 303/106 |
| 4,085,978 | 4/1978 | Nogami .............................. | 188/349 X |
| 4,091,348 | 5/1978 | Kawamoto et al. ............... | 335/277 X |
| 4,418,966 | 12/1983 | Hattwig ............................. | 303/100 |
| 4,435,021 | 3/1984 | Hoenick ............................ | 303/119 X |
| 4,462,642 | 7/1984 | Leiber ............................... | 303/DIG. 4 |
| 4,466,671 | 8/1984 | Miyasaka .......................... | 303/9.73 |
| 4,515,343 | 5/1985 | Pischinger et al. ............... | 251/129.15 X |
| 4,522,372 | 6/1985 | Yano et al. ........................ | 251/129.15 |
| 4,523,792 | 6/1985 | Belart et al. ...................... | 303/100 X |
| 4,531,708 | 7/1985 | Livet ................................. | 251/129.15 X |
| 4,532,951 | 8/1985 | Fermanich ........................ | 251/129.15 X |
| 4,561,701 | 12/1985 | Fujii et al. ........................ | 303/119 |
| 4,668,023 | 5/1987 | Every et al. ...................... | 303/61 X |
| 4,673,226 | 6/1987 | Every et al. ...................... | 303/109 |

FOREIGN PATENT DOCUMENTS 2106605  4/1983  United Kingdom ................ 303/119

Primary Examiner—Douglas C. Butler
Attorney, Agent, or Firm—Ralph J. Skinkiss; Mark J. Sobanski

[57] ABSTRACT

The present invention concerns a vehicle anti-lock brake control system which does not require the use of an auxiliary hydraulic pump and, in the preferred embodiment, is adapted to control only the rear brakes of a four-wheel vehicle. The control system includes a normally open solenoid actuated isolation valve connected between the master cylinder and the rear wheel brakes, and a normally closed solenoid actuated dump valve connected between the rear wheel brakes and a fluid accumulator. A computer control is connected to monitor the rear wheel speed and deceleration and, during breaking of the vehicle, functions to control the application of hydraulic pressure to the rear brakes via the isolation and dump valves in order to prevent lockup of the brakes. In the event excessive rear wheel deceleration is detected during a vehicle stop, the computer control closes the isolation valve to hold pressure to the rear brakes at a relatively constant level. If, after the isolation valve has been closed, the difference between the actual rear wheel speed and a calculated theoretical speed ramp valve exceeds a predetermined slip threshold, the dump valve is selectively opened to reduce pressure to the rear brakes and correct the wheel slip condition. The computer control is adapted to monitor several operating parameters while the system is in the anti-lock mode in order to determine whether additional pressure should be applied to the rear brakes by selectively opening the isolation valve.

41 Claims, 9 Drawing Sheets

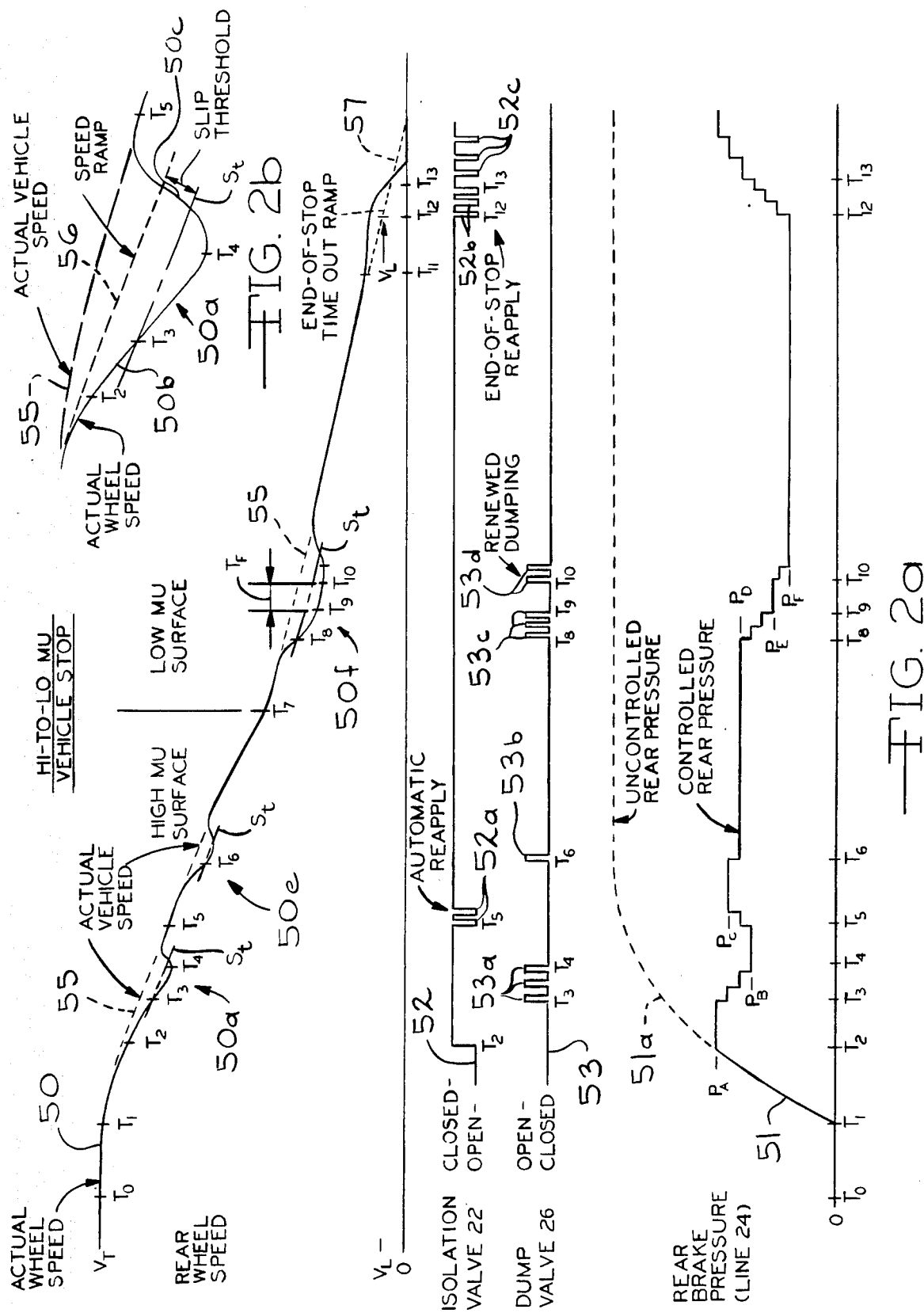

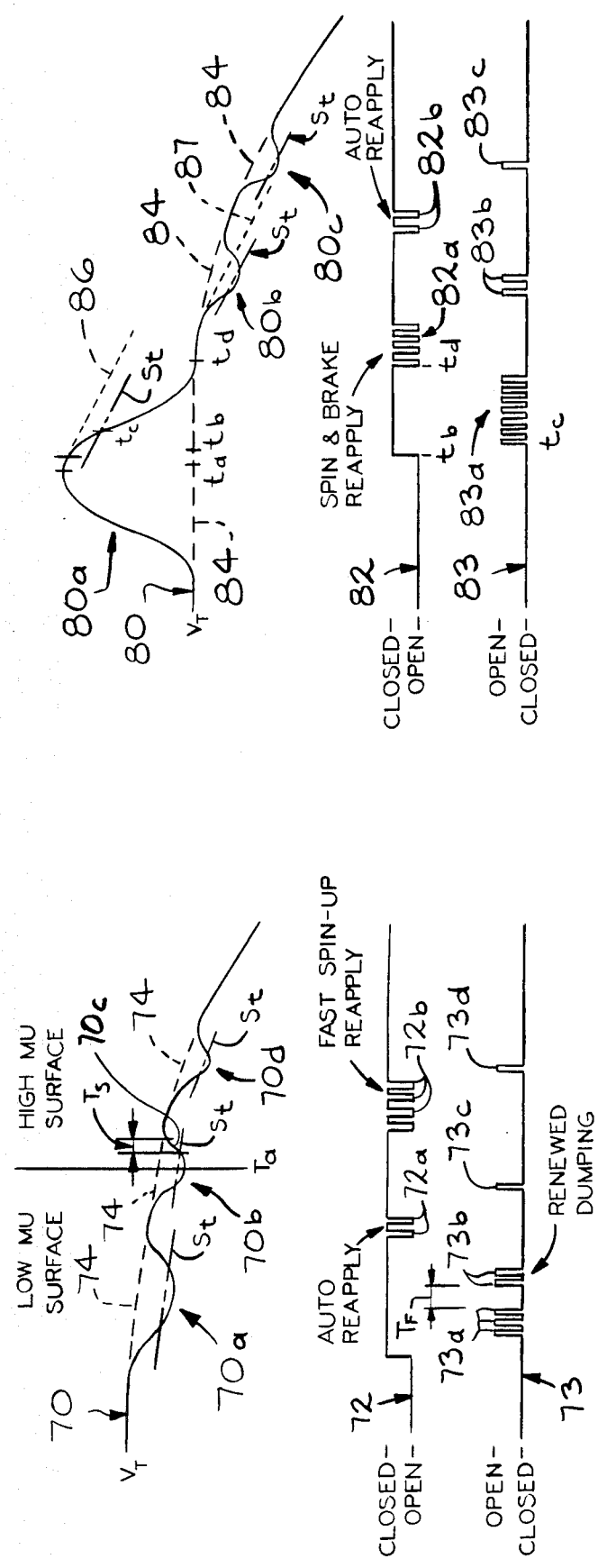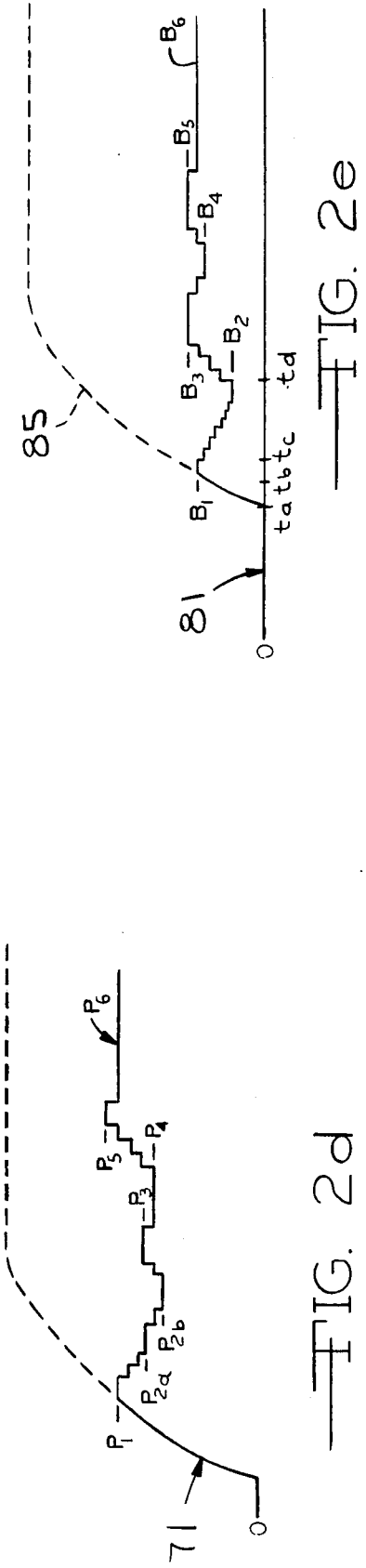
FIG. 2d
FIG. 2e

VEHICLE ANTI-LOCK BRAKE SYSTEM

CROSS-REFERENCE TO RELATED APPLICATION

This application is a continuation-in-part of U.S. patent application Ser. No. 702,765, filed Feb. 19, 1985, now U.S. Pat. No. 4,673,226, entitled VEHICLE SKID CONTROL SYSTEM and assigned to the assignee of the present invention.

BACKGROUND OF THE INVENTION

This invention relates generally to vehicle anti-lock brake systems and, more particularly, to an anti-lock brake system which does not require the use of an auxiliary hydraulic pump and which is operative to selectively control the application of hydraulic fluid pressure to selected brakes to prevent locking of the associated wheels.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing the wheels to lock such that excessive slippage between the wheels and the road surface takes place. Wheel lock-up conditions can lead to loss of directional stability and, possibly, uncontrolled vehicle spinout.

In a continuing effort to improve the operational safety of vehicles, many companies have been involved in the development of anti-lock braking systems. While typically such systems are adapted to control the braking of each braked wheel of a vehicle, some systems have been developed for controlling the braking of only a portion of the braked wheels. Examples of prior art anti-lock brake systems are disclosed in U.S. Pat. Nos. 3,515,440; 3,731,979; 3,870,376; and 3,880,474.

Generally, prior art anti-lock brake systems include a central control unit for monitoring the speed and deceleration of the controlled wheels. When the brakes of the vehicle are applied and the control unit senses an impending wheel lock-up condition, the central control unit functions to control the application of hydraulic pressure through a control valve means to the associated brakes to prevent lock-up of the controlled wheels. Typically, the anti-lock brake system includes means for cyclically relieving and reapplying pressure to the associated brakes to limit wheel slippage to a safe level while continuing to produce adequate brake torque to decelerate the vehicle as desired by the driver. In these systems, the means for reapplying pressure is generally a separate hydraulic power source. An example of an anti-lock brake system which does not require the use of a separate hydraulic pump is disclosed in U.S. Pat. No. 4,418,966.

Despite the tremendous advantages an anti-lock brake system can provide in stopping a vehicle in a controlled manner under adverse braking conditions, few vehicles are actually provided with such control systems. One of the chief reasons for this is that the control units and associated valving of such systems are somewhat sophisticated and expensive, and are therefore typically only found on more expensive vehicles.

SUMMARY OF THE INVENTION

The present invention concerns a unique anti-lock vehicle brake control system which does not require the use of a separate hydraulic pump and, in the preferred embodiment, is utilized to only control the braking pressure to the rear wheels of a four-wheel vehicle. The anti-lock brake system of the present invention monitors the rear wheel speed and deceleration and, during the braking of the vehicle, functions to control the application of hydraulic pressure to the vehicle rear brakes via an anti-lock control valve in order to prevent lock-up of the associated wheels. When excessive rear wheel deceleration is detected during a vehicle stop, this indicates that a first wheel speed departure has occurred and that the rear wheels are approaching an impending lock-up condition. The control then closes an isolation valve to hold pressure to the rear brakes at a relatively constant level. If, after the isolation valve has been closed, the difference between the rear wheel speed and a calculated theoretical speed ramp value exceeds a predetermined slip threshold, and the rear wheel deceleration exceeds a predetermined amount, a dump valve can be selectively opened to reduce pressure to the rear brakes and correct the first wheel speed departure.

After the first wheel speed departure cycle, and depending on the various operating parameters monitored by the system, the control can enter one of five separate reapply modes to apply additional pressure to the rear brakes by selectively opening the isolation valve. Since the anti-lock control system of the present invention does not utilize a separate hydraulic pump, the instances wherein additional pressure is to be supplied to the rear brakes must be carefully monitored and controlled, since the supply of pressurized fluid which can be used to increase pressure is very limited as compared to systems which utilize a separate pump.

Following the first wheel speed departure cycle, the control enters an "automatic" reapply mode to automatically apply additional pressure to the rear brakes to cause a second wheel speed departure, which is then corrected by selectively dumping pressure. This automatic reapplication of pressure ensures that the maximum controlled pressure is applied to the rear brakes during the anti-lock stop.

Once the system has corrected the second wheel speed departure, the system monitors the changes in deceleration of the rear wheels to detect instances wherein the vehicle has traveled from a relatively low mu surface such as ice to a relatively high mu surface such as concrete. In these instances, when the vehicle front wheels contact the higher mu surface, the uncontrolled front brakes will cause an increase in the deceleration of the vehicle as the vehicle travels from the low mu surface to the high mu surface. In this situation, the system will enter a "low-to-high mu" reapply mode to selectively open the isolation valve and increase the pressure to the rear brakes.

The anti-lock control enters an "end-of-stop" reapply mode to apply additional pressure at or near the end of the vehicle stop. This ensures that there is sufficient rear brake pressure to overcome the engine idle torque supplied to the rear wheels and thus prevent spinning of the rear wheels when the vehicle has stopped on a relatively low mu surface.

The control of the present invention is also operative to selectively apply additional pressure subsequent to detecting a "spin and brake" situation. Such a situation can occur on a relatively low mu surface wherein a driver has momentarily depressed the accelerator to "spin-up" the rear wheels above actual vehicle speed,
} and then has immediately applied brake pressure. In this situation, a "spin and brake" reapply mode is entered to apply additional pressure after the rear wheel speed has returned to the actual vehicle speed.

Further, the control is operative to selectively apply additional pressure after "fast spin-up" situations. These situations occur when, during the spin-up portion of a wheel speed departure cycle, the acceleration of the rear wheels continues to exceed a predetermined amount over a predetermined time period, and the slip threshold is not exceeded. It has been found that this situation is indicative of a low-to-high mu surface change during a wheel speed departure cycle. In such a situation, the control enters a "fast spin-up" reapply mode to selectively apply additional pressure to the rear brakes.

The control is also provided with a unique approach for controlling the selective reduction of pressure to the rear brakes when a wheel speed departure occurs on a relatively low mu surface. When selectively operating the dump valve to reduce pressure to the rear wheels and correct a wheel speed departure, the control is normally operative to discontinue opening of the dump valve when the rear wheel deceleration falls below a predetermined amount. However, the control will continue to monitor the rear wheel speed and if, after a predetermined time period, the slip threshold continues to be exceeded, the control will enter a "renewed dumping" mode to further reduce pressure until either the slip threshold is not exceeded or the rear wheels begin to accelerate.

The above, as well as the other features and advantages of the present invention, will become readily apparent to one skilled in the art from reading the following detailed description in conjunction with the attached drawings.

BRIEF DESCRIPTION OF THE DRAWINGS

FIGS. 2a through 2e are waveform diagrams generally illustrating the operation of the anti-lock brake system in various braking situations under various road surface conditions.

DESCRIPTION OF THE PREFERRED EMBODIMENT

It should be noted at the outset of this description that, while the control system is described herein for use with an anti-lock brake system which is adapted to control only the rear wheels of a four-wheel vehicle, the control system (or portions thereof) can also be used in four-wheel anti-lock brake systems.

Figure 1:
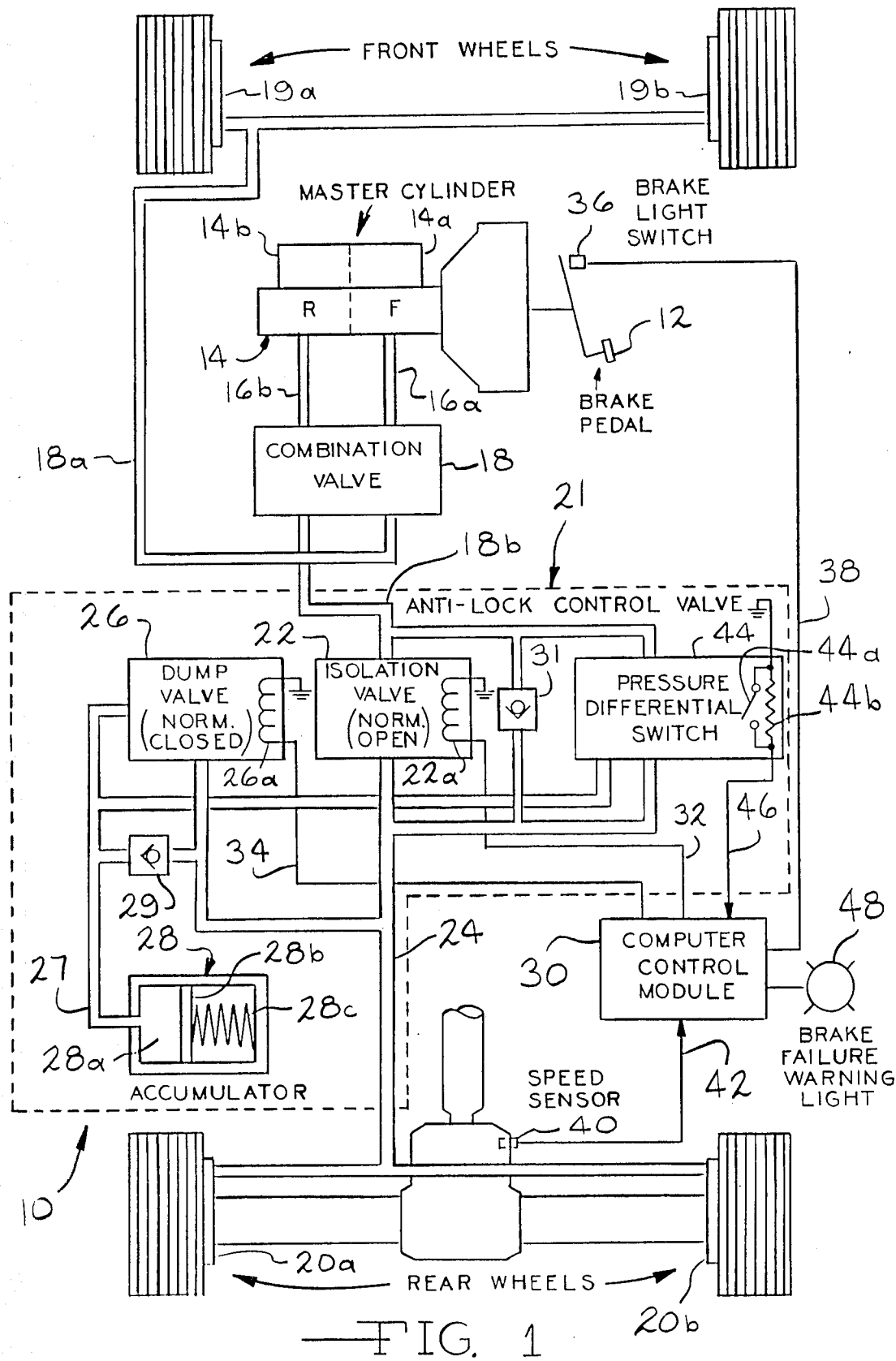
FIG. 1 is a schematic diagram illustrating a vehicle anti-lock brake system according to the present invention.

With reference to the drawings, FIG. 1 shows a schematic diagram of a vehicle anti-lock brake system 10 in accordance with the present invention. The anti-lock brake system 10 is specifically adapted to monitor and control the braking of a predetermined number of wheels of a multi-wheeled vehicle having at least one braked wheel which is not controlled by the anti-lock control system. For example, as illustrated in FIG. 1, the anti-lock brake system can be utilized to control the braking of the rear wheels of a four-wheel vehicle wherein the front brakes of the vehicle are not controlled by the anti-lock brake system. Such a system is especially desirable for a vehicle such as a small truck, for example, wherein the weight supported by the rear wheels can vary greatly due to the wide range of payloads the truck may be transporting, and the proportioning between front/rear brake pressure can be difficult to control.

As shown in FIG. 1, the anti-lock brake system is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a and from a rear reservoir 14b through hydraulic line 16b to a conventional combination or proportioning valve 18. The combination or proportioning valve 18 includes a first output line 18a adapted to supply hydraulic fluid at a first predetermined pressure to actuate the vehicle front brakes 19a and 19b and a second output line 18b which supplies fluid at a second predetermined pressure to actuate the vehicle rear brakes 20a and 20b. While not shown in the drawings, the combination valve 18 is typically provided with an integral differential pressure switch for detecting a predetermined pressure difference between the fluid in the lines 16a and 16b, which difference is indicative of a partial brake failure.

The anti-lock system utilizes a control valve 21 to selectively control the application of pressure to the rear brakes 20a and 20b when the system is in the anti-lock mode. The valve 21 can be of the type disclosed in U.S. Pat. Nos. 4,668,023 and 4,673,226, both of which are herein incorporated by reference. More specifically, the control valve 21 includes a normally open isolation valve 22 connected between the line 18b and a line 24 which supplies the pressurized brake fluid to the rear brakes 20a and 20b. As will be discussed, the isolation valve 22 is solenoid operated and is closed in the event impending rear wheel lockup is detected to hold the pressure in the line 24 at a relatively constant level and thus prevent any further increase in pressure in the line 18b from being supplied to line 24.

Also, the valve 21 includes a normally closed dump valve 26 connected between the line 24 and a line 27 which is connected to a fluid accumulator 28. The accumulator 28 includes a variable volume fluid reservoir 28a for containing hydraulic fluid which is maintained at a slightly elevated pressure by a slidable piston 28b biased by a spring 28c. More specifically, the spring 28c maintains the fluid in the accumulator at a pressure slightly above the non-actuated pressure of the fluid in the line 24. As will be discussed, when the isolation valve 22 has been closed and the pressure held in the line 24 continues to cause excessive slippage of the rear wheels, the dump valve 26 is selectively opened to direct fluid into the accumulator 28 to reduce the pressure in the line 24 and prevent lockup of the rear brakes. After the brake pedal 12 has been released, the isolation valve 22 is opened and the pressurized fluid in the accumulator 28 can be returned to the line 24 through a check valve 29. Alternatively, the check valve 29 can be eliminated and the dump valve 26 can be momentarily opened after the brake pedal is released to return fluid in the accumulator 28 to the line 24. A check valve 31 is connected across the isolation valve 22 between the lines 18b and 24 and provides for fluid flow from the line 24 to the line 18b when the pressure in the line 24 is greater than the pressure in the line 18b. Thus, when the brake pedal is released and the isolation valve is opened, higher pressure in the line 24 can flow to the line 18b through both the open isolation valve 22 and the check valve 31.

The operation of the isolation valve 22 and the dump valve 26 is controlled by a computer control module 30. The isolation valve 22 and the dump valve 26 are solenoid operated valves having solenoids 22a and 26a which can be connected to the computer control module by means of electric lines 32 and 34 respectively. In order to determine whether the vehicle operator is in the process of braking the vehicle, the computer control 30 is connected to a brake light switch 36 by a line 38 to monitor whether the brake pedal 12 is depressed. The computer control module 30 is also connected by a line 42 to a speed sensor 40 which monitors the average speed of the vehicle rear wheels by sensing the rotation of the rear differential ring gear (not shown).

In addition to monitoring the position of the brake pedal 12 via the brake light switch 36 and the rear wheel speed via the speed sensor 40, the computer control module 30 is connected to a differential pressure switch 44 by a line 46. The switch 44 provides two separate functions. First, when the system is operating in the anti-lock mode, the switch 44 is used to monitor the differential pressure across the isolation valve. Secondly, when the system is not in the anti-lock mode and the vehicle is in a normal braking mode, the switch 44 is used to monitor the condition of the dump valve.

To perform its first function, the differential pressure switch 44 is coupled to monitor the pressure difference between the fluid in the lines 18b and 24 and is adapted to close contacts 44a to ground the line 46 when the pressure in the line 18b is greater than the pressure in the line 24. When the system is in the anti-lock mode and the differential pressure switch contacts 44a are closed, this indicates that the isolation valve has closed and that the pressure in the line 18b is greater than the pressure in the line 24 and, when the switch contacts 44a are open, this indicates that the pressure in the line 18b is equal to or has dropped below the pressure in the line 24.

In instances wherein the contacts 44a have closed, and have subsequently opened while the brake light switch 36 has remained actuated, this indicates a situation wherein the operator has initially applied a relatively heavy braking effort to the brake pedal to cause the system to enter an anti-lock mode and close the isolation valve to prevent lockup of the rear wheels and, subsequently, has reduced braking effort to the pedal without necessarily completely releasing the pedal. It is in this situation that it is desirable to release the anti-lock mode and return the braking system to the normal operating mode. Thus, if the system is in the anti-lock mode and the computer control 30 senses that the differential pressure switch contacts 44a have at one point closed, but are now opened, and the brake pedal is still depressed, the system will return to the normal braking mode. Typically, there is some hysteresis associated with the operation of the differential pressure switch 44 such that the switch contacts 44a do not chatter between a closed and open position when the pressure in the line 18b remains relatively equal to the pressure in the line 24.

When the brake system is not operating in the anti-lock mode, the differential switch 44 is connected to check the valve seat condition of the dump valve 26 by monitoring the fluid pressure in the accumulator 28. At this time, the accumulator 28 should be empty, and the normally closed dump valve 26 should prevent pressurized fluid in the line 24 from being supplied to the accumulator. However, in the event fluid leaks past the dump valve seat into the accumulator, the pressure increase in the line 27 will be detected by the switch 44, which closes the switch contacts 44a to signal the control 30 of a potentially defective dump valve.

As shown in FIG. 1, the differential switch 44 can be provided with an integral resistor 44b connected in parallel with the switch contacts 44a. The resistor 44b typically has a relatively high resistance value, such as 10K ohms. The resistor 44b enables the computer control module 30 to check the continuity of the line 46 when system is not in the anti-lock mode and the contacts 44a are open. In these instances, the line 46 should provide a signal path to ground through the resistor 44b. The control module 30 is connected to a brake failure warning light 48 which is activated in the event a failure in the anti-lock brake system is detected.

Basically, the anti-lock brake system of the present invention monitors the rear wheel speed and deceleration and, during braking of the vehicle, functions to control the application of hydraulic pressure to the vehicle rear brakes via the control valve 21 in order to prevent a lockup condition of the brakes. In the event excessive rear wheel deceleration is detected, indicating that a wheel speed departure has occurred and that the rear brakes are approaching a lockup condition, the control module 30 closes the isolation valve 22 to hold the pressure in the line 24 at a relatively constant level. If, after the isolation valve 22 has been closed, the difference between the actual rear wheel speed and a calculated theoretical speed ramp value exceeds a predetermined slip threshold, and the rear wheel deceleration exceeds a predetermined amount, the dump valve 26 can be selectively opened to reduce the pressure in the line 24 to correct the impending lock-up condition.

In some instances, after an impending lockup condition has been corrected, it is desirable to reapply additional pressure to the rear brakes to increase braking of the rear wheels. For example, with the present invention, it has been found desirable to automatically apply additional pressure following the first wheel speed departure cycle to cause a second wheel speed departure. This automatic reapplication of pressure ensures that the maximum controlled pressure is supplied to the rear brake during an anti-lock stop.

Also, after the second wheel speed departure cycle, the system monitors the changes in deceleration of the rear wheels to detect instances wherein the vehicle travels from a road surface such as ice wherein the coefficient of friction (mu) between the vehicle and the road surface is relatively low (low mu surface) to a road surface such as concrete wherein the coefficient of friction between the vehicle and the road surface is relatively high (high mu surface). In these instances, when the vehicle front wheels contact the higher mu surface, the uncontrolled front brakes will cause an increase in the deceleration of the vehicle as the vehicle travels from the low mu surface to the high mu surface. Under these conditions, the pressure held in the line 24 to the rear brakes can generally be increased to provide further braking without causing a lockup condition of the rear brakes. This is accomplished by momentarily opening the isolation valve 22 to permit the higher pressure fluid in the line 18b to be supplied to the line 24. Due to the continued braking effort by the driver on the vehicle brake pedal under a hard braking condition, the pressure in the line 18b will generally be higher than the pressure in the line 24.

The anti-lock control also automatically reapplies additional pressure at or near the end of a vehicle stop. This end-of-stop reapply mode, along with other reapply modes, will be discussed in more detail below.

Figure 2C:
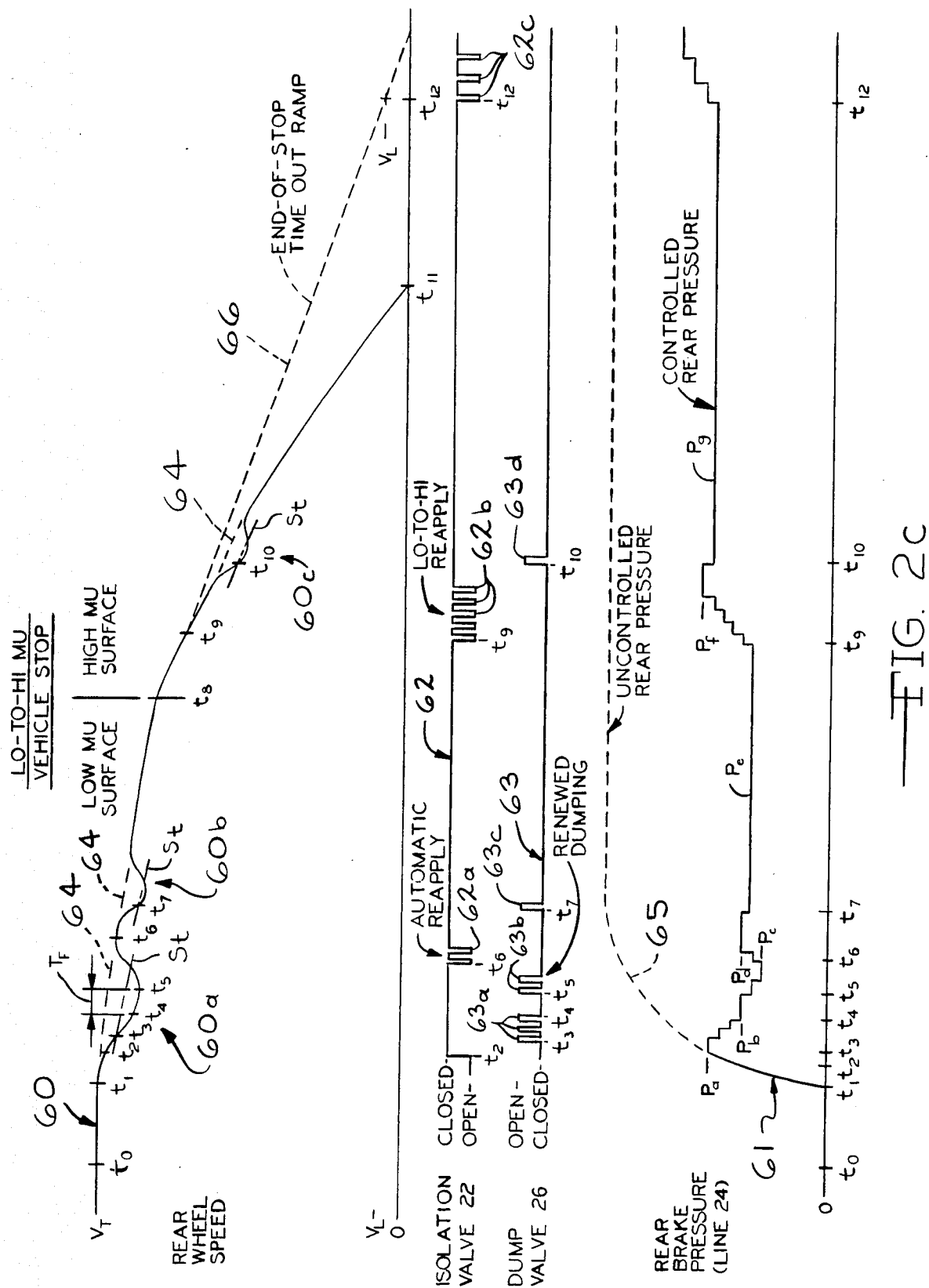

Referring now to FIGS. 2a through 2e, there are shown waveform diagrams which will be utilized to describe the operation of the anti-lock system under various braking situations. In particular, FIG. 2a illustrates the operation of the anti-lock control system as the vehicle begins braking on a relatively high mu surface, enters the anti-lock control mode, and then travels onto a relatively low mu surface under the anti-lock control. FIG. 2b is an enlargement of the portion of FIG. 2a illustrating the initial wheel speed departure cycle. FIG. 2c illustrates the operation of the anti-lock system when the vehicle initially begins a stop on a relatively low mu surface, enters the anti-lock mode, and then travels onto a higher mu surface for the completion of the stop. FIG. 2d illustrates the operation of the anti-lock system when the vehicle initially begins a stop on a relatively low mu surface, enters the anti-lock mode and then, during a second wheel speed departure cycle, travels from a low mu surface onto a relatively high mu surface. FIG. 2e illustrates a vehicle stop wherein initally, prior to application of the vehicle brakes, the controlled wheels are spinning at a velocity greater than the vehicle speed, and the system enters the anti-lock mode during the time period when the wheels are spinning above vehicle speed.

Referring now to FIG. 2a, the actual rear wheel speed is indicated by an upper curve 50, while the actual rear wheel brake pressure is indicated by a lower curve 51. The operation of the isolation valve 22 is represented by the waveform 52, while the operation of the dump valve 26 is represented by the waveform 53. Initially at the time $T_0$, the vehicle is traveling along a relatively high mu surface, such as dry asphalt or concrete, at a speed $V_T$ without the vehicle brakes applied. At this time, the isolation valve 22 is open while the dump valve 26 is closed. At time $T_1$, the driver initiates a hard vehicle stop by fully depressing the brake pedal to quickly increase the brake pressure in the line 24 and cause the vehicle to decelerate. Initially, the brake pressure in the line 24 is not sufficient to cause any lock-up of the rear wheels. However, shortly after the time $T_1$, the rear wheel speed begins to slip relative to the actual vehicle speed (represented by the dashed curve 55) to cause the rear wheels to enter a first wheel speed departure cycle 50a.

An enlarged view of the first wheel speed departure cycle 50a of FIG. 2a is shown in FIG. 2b. As shown in FIG. 2b, after time $T_1$, the actual wheel speed 50 begins to drop relative to the actual vehicle speed 55, as indicated by portion 50b. As will be discussed, prior to entering the wheel speed departure cycle 50a, the computer control has calculated a theoretical speed ramp, represented by the dashed line 56, which represents the speed the vehicle would travel if decelerated at a predetermined maximum rate, for example, 1.0 g. The computer control also continues to monitor the deceleration of rear wheels and the actual speed of the rear wheels relative to the calculated speed ramp value. When the deceleration of the rear wheels reaches a predetermined value (e.g. 1.3 g) at time $T_2$, the computer control generates a signal to close the isolation valve to hold pressure in the line 24 at a constant level $P_A$, while the uncontrolled rear brake pressure follows curve 51a. When the difference between the actual wheel speed 50 and the calculated speed ramp value 56 exceeds a predetermined slip threshold (shown in FIG. 2b as an amount $S_t$), this indicates that a predetermined slippage is occurring between the actual wheel speed and the vehicle speed. In FIGS. 2a and 2b, the slip threshold $S_t$ is exceeded and the rear wheel deceleration exceeds a predetermined amount at time $T_3$. At this time, the actual wheel speed has fallen sufficiently that it is desirable to selectively reduce the pressure to the rear wheels in an attempt to return the actual wheel speed to the vehicle speed. Thus, the computer control generates one or more dump pulses 53a, beginning at time $T_3$, to selectively reduce the rear brake pressure to a level $P_B$. The particular number of dump pulses generated will vary depending on the particular control valve used, and on the amount of pressure reduction which occurs for each pulse. It will be appreciated that the uniform width and spacing between a series of dump pulses are shown for the sake of simplicity and that, as discussed in U.S. Pat. No. 4,673,226, it may be desirable to control the width and spacing between dump pulses to obtain a desired pressure reduction curve.

Generally, the dump pulses 53a are terminated approximately at a time $T_4$ wherein the actual deceleration of the wheel has fallen below the predetermined amount. After the actual wheel speed "spins up" along portion 50c and returns to the actual speed to complete the first wheel speed departure cycle 50a and correct the slip condition, it has been found desirable to selectively and automatically reapply additional pressure to the rear brakes in order to ensure that the maximum controlled pressure is applied to the rear brakes. As shown in the isolation valve waveform 52, a series of automatic reapply pulses 52a are generated at time $T_5$ after the end of the spin-up portion 50c to selectively increase the rear brake pressure to a level $P_C$. Typically, the number of automatic reapply pulses 52a will vary depending on the particular control valve used. The pulses 52a are generated until a second wheel speed departure cycle 50e is initiated. As was the case with the dump pulses, the width and spacing between successive reapply pulses can be varied to control the pressure application curve. Once the slip threshold has been exceeded in the second wheel speed departure cycle, one or more dump pulses 53b are generated to correct the slip condition and reduce the rear brake pressure to a level $P_D$. Thereafter, as long as the uncontrolled pressure 57 supplied by the vehicle driver is above the pressure $P_D$, the antilock system will maintain the pressure at the level $P_D$ as long as the road surface friction remains relatively constant. Typically, the pressure $P_D$ will be greater than the pressure $P_B$.

In the event the vehicle travels from the high mu surface to a low mu surface (at time $T_7$), the controlled pressure $P_D$ to the rear brakes may be sufficiently high to initiate slipping of the rear wheels to cause a third wheel speed departure 50f. At time $T_8$, when the slip threshold $S_T$ is exceeded and the rear wheel deceleration exceeds the predetermined amount, the computer control will generate a first set of dump pulses 53c to reduce the brake pressure to a level $P_E$. The dump pulses 54c, as in the case of the dump pulses 54a, are generated until a time $T_9$ when the actual wheel deceleration has fallen below the predetermined amount.

However, it has been found that, in some instances such as vehicle stops on low mu surfaces, terminating the dump pulses at the time $T_9$ may not reduce pressure sufficiently to cause the wheel speed to spin up and return to the actual vehicle speed. Thus, it has been found desirable to monitor the time period after time $T_9$ during which the wheel slip continues to exceed the predetermined slip threshold. In the event a predetermined time period $T_F$ has expired after the time $T_9$, and the actual wheel speed continues to exceed the slip threshold $S_T$, and the rear wheels are not accelerating, the system will further reduce pressure to the rear brakes to a level $P_F$ by generating renewed dumping pulses 54d beginning at time $T_{10}$. The renewed dumping pulses are generated until either the actual wheel slip falls below the slip threshold $S_T$, or the rear wheels being accelerating. The controlled wheel brake pressure is then maintained at this reduced level $P_F$ for the low mu surface until the vehicle reaches the end of the vehicle stop. The time period $T_F$ can be determined by first measuring the time normally required for the wheel slip to fall below the slip threshold after the last dump pulse is generated on medium and high mu surfaces, and then selecting a time period slightly greater than this amount.

The anti-lock control is provided with a unique end-of-stop portion to ensure that sufficient brake pressure is supplied to the rear brakes at the end of a vehicle stop in order to overcome any wheel torque that may be supplied to the wheels by a vehicle engine. Generally, at the end of a vehicle stop, the only torque supplied by the vehicle engine is that produced by the engine when at idle. Normally, when the vehicle is stopping on a high mu surface, and the only torque supplied to the rear wheels is produced by the engine running at a normal engine idle speed, it is not necessary to apply any additional pressure at the end of a vehicle stop. However, in situations wherein the vehicle is stopping on a low mu surface, and the engine may be in a high idle mode, it is possible that the controlled wheel brake pressure during the stop may not be sufficient to keep the rear wheels from spinning on a low mu surface after the vehicle has stopped. In these instances, it is desirable to apply additional pressure near the end of a vehicle stop to increase the rear pressure sufficiently to prevent wheel spinning on the low mu surface.

With the present invention, the control estimates the time the vehicle should come to a complete stop if it were traveling on a relatively low mu surface by calculating an end-of-stop time out ramp, represented by the dashed line 57 of FIG. 2a. In most instances, the rear wheel speed will be less than the time out ramp and the vehicle will come to a complete stop and the driver will release the brake pedal to disable the anti-lock mode prior to the end of the end-of-stop time out ramp. However, in some situations, such as the situation illustrated in FIG. 2a, the end-of-stop ramp falls below the rear wheel speed (at time $T_{11}$) and the end of stop time out ramp may reach a low speed limit $V_L$ at a time $T_{12}$, which is prior to the time $T_{13}$ when the actual wheel speed reaches the low speed limit. In these situations, the control will begin to generate a series of end-of-stop reapply pulses 52b at a predetermined spacing to further increase the pressure to the rear wheels and cause further deceleration of the controlled wheels. At time $T_{13}$, when the actual wheel speed reaches the low speed limit $V_L$, the spacing between the end of stop reapply pulses can be increased as shown in pulses 52c.

Referring now to FIG. 2c, there is shown the operation of the anti-lock system when the vehicle initially begins a stop on a low mu surface, enters the anti-lock mode, and then travels onto a higher mu surface while under anti-lock control. In FIG. 2c, an upper curve 60 represents the actual rear wheel speed, while a lower curve 61 represents the controlled pressure to the rear brakes. A waveform 62 represents the status of the isolation valve 22, while a waveform 63 represents the status of the dump valve 26. A dashed portion 64 of the upper curve 50 represents the actual vehicle speed and a dashed portion 65 of the lower curve 61 represents the uncontrolled rear brake pressure.

Initially, at time $t_0$, the vehicle is traveling at speed $V_T$, and the brakes of the vehicle are not applied. At time $t_1$, the vehicle driver initiates a hard vehicle stop by fully depressing the vehicle brake pedal. This produces an initial rapid increase in rear brake pressure which, shortly after the time period $t_1$, causes the rear wheels to begin to slip. At time $t_2$, when the deceleration of the rear wheels exceeds a predetermined amount, the computer control generates a signal to close the isolation valve and hold the pressure to the rear brakes at a level $P_a$. At time $t_3$, the rear wheel speed has exceeded the slip threshold $S_t$ and the rear wheel deceleration is above the predetermined amount. At this time, the computer control will generate a series of dump pulses 63a to reduce the pressure to a level $P_b$.

The dump pulses 63a are generated until a time $t_4$ when the rear wheel deceleration falls below the predetermined amount. As shown in FIG. 2c, if the rear wheel speed continues to exceed the slip threshold $S_t$ for a predetermined time period $T_F$ and the rear wheels are not accelerating, the control is operative to generate a series of renewed dumping pulses 63b, commencing at time $T_5$ to reduce the pressure to a level $P_c$. These renewed dumping pulses 63b are similar to the renewed dumping pulses 53d generated during the third wheel speed departure cycle 50f of FIG. 2a. The renewed dumping pulses 63b are generated until the rear wheel begins to accelerate or the slip threshold is not exceeded.

After the initial dumping of pressure, a series of automatic reapply pulses 62a are generated at time $t_6$ to cause a second wheel speed departure cycle 60b. The automatic reapply pulses 62a result in a pressure increase to a level $P_d$ and are generated until the rear wheel deceleration exceeds a predetermined amount. At time $t_7$, when the rear wheel speed again falls below the predetermined slip threshold $S_t$, one or more dump pulses 63c are generated to correct the second wheel speed departure and reduce the rear wheel brake pressure to a level $P_e$.

At this point, if the road surface friction were to remain relatively constant, the pressure would be held at the level $P_e$ for the remainder of the stop. However, should the vehicle travel from a low mu surface onto a high mu surface as indicated at time $t_8$, the control will sense the increase in wheel deceleration of the vehicle which occurs as a result of the uncontrolled braked front wheels. If a predetermined increase in wheel deceleration is sensed, the control is operative to generate a series of reapply pulses 62b, commencing at time $t_9$, to increase the pressure to a level $P_f$. The reapply pulses 62b are generated until a time when the rear wheel deceleration begins to exceed a predetermined amount and cause a third wheel departure cycle 60c. At time $t_{10}$, when the rear wheel speed exceeds the predetermined slip threshold, a dump pulse 63d is generated to reduce the pressure to a level $P_g$ to correct the wheel slip condition and complete the third wheel speed departure cycle. Thereafter, the rear brake pressure is held at the level $P_g$ until the actual completion of the stop, which occurs at time $t_{11}$.

In FIG. 2c, an end-of-stop time-out ramp 66 is initiated at the beginning of the low to high reapply pulses 62b and, as shown in FIG. 2c, does not reach the low speed limit $V_L$ until the time $t_{12}$. Should the vehicle driver continue to apply full pressure to the brake pedal following the actual completion of the vehicle stop, the control is operative to generate a series of reapply pulses 62c commencing at the time $t_{12}$. However, normally, the vehicle driver will release the brake pedal between the times $t_{11}$ and $t_{12}$ to return the braking control to a normal braking mode.

Referring now to FIG. 2d, there is shown the operation of the anti-lock system as the vehicle travels from a low mu surface to a high mu surface during a second wheel speed departure cycle. As shown in FIG. 2d, an upper waveform 70 represents the actual rear wheel speed, while a lower waveform 71 represents the controlled rear brake pressure. The waveform 72 represents the status of the isolation valve 22, while the waveform 73 represents the status of the dump valve 26. A dashed portion 74 of the upper waveform 70 represents the actual vehicle speed and a dashed portion 75 of the lower waveform 71 represents the uncontrolled rear brake pressure.

Initially, when the rear wheels begin to enter a first wheel speed departure cycle 70a, the isolation valve is closed to hold the pressure at a level $P_1$. Thereafter, a first series of dump pulses 73a are generated to first reduce the pressure level to a level $P_{2a}$. Next, after the time period $T_F$, renewed dumping pulses 73b are generated in a manner as described above to correct the first wheel speed departure. In accordance with the present invention, a series of automatic reapply pulses 72a are then generated to increase the pressure to a level $P_3$ and cause a second wheel speed departure cycle 70b. A dump pulse 73c is then generated to reduce the pressure to a level $P_4$ to correct the second wheel speed departure and return the rear wheel speed to the actual vehicle speed.

In FIG. 2d, the vehicle travels from a low mu surface to a high mu surface during the second wheel speed departure cycle at time $T_a$. The computer control can detect such a change in road surface conditions by monitoring the acceleration of the spinup portion 70c of the second wheel speed departure cycle 70b. It has been found that if the wheel speed acceleration exceeds a predetermined rate for a predetermined time period $T_s$ after the slip condition is corrected, this is an indication that the vehicle has traveled from a low mu surface to a high mu surface. The predetermined acceleration rate, along with the time period $T_s$, can be determined by first measuring the wheel acceleration and time periods for a high mu wheel speed departure, and then selecting an acceleration rate and time period which is greater than these amounts. In this situation, the control will generate a series of "fast spinup" reapply pulses 72b to increase the pressure to a level $P_5$. These pulses are initiated after the rear wheel is no longer accelerating and are continued until the rear wheel deceleration exceeds a predetermined amount, thus causing a third wheel speed departure cycle 70d. Thereafter, a dump pulse 73d is generated to reduce the pressure to a level $P_6$ and correct the resulting slip condition.

Referring to FIG. 2e, there is shown the operation of the anti-lock control in instances wherein the vehicle enters the anti-lock mode when the rear wheels are spinning at a speed above the actual vehicle speed. In FIG. 2e, the upper waveform 80 represents the actual rear wheel speed, and the lower waveform 81 represents the actual rear brake pressure. The waveform 82 represents the status of the isolation valve, while the waveform 83 represents the status of the dump valve. A dashed portion 84 of the upper waveform 80 represents the actual vehicle speed, and a dashed portion 85 of the lower waveform 81 represents the uncontrolled rear brake pressure.

In FIG. 2e, the actual wheel speed at time $t_a$ when the vehicle brakes are applied is in excess of the actual vehicle speed. Such a situation can occur on a relatively low mu surface wherein a driver has momentarily depressed the accelerator to "spin up" the rear wheels as shown at 80a, and then has immediately applied brake pressure. In this situation, after the brakes have been applied at time $t_a$, the rear wheel speed will begin to quickly decelerate to cause the isolation valve to close (at time $t_b$) and hold pressure at the level $B_1$. It should be noted that, in most instances, the pressure level $B_1$ will be very close to zero, since minimum pressure is required to cause excessive rear wheel deceleration. However, in order to more clearly illustrate the subsequent attempted pressure reduction, the level $B_1$ is shown in the drawings above zero pressure. After the isolation valve is closed, the computer control will then sense excessive slippage between a computed speed ramp 86 and the actual wheel speed, and will generate a series of dump pulses 83a (at time $t_c$) in an attempt to return the actual rear wheel speed to a point above the slip threshold $S_t$. However, due to the spin-up portion 80a, the pressure reduction by the dump pulses 83a cannot increase the rear wheel speed to a point above the actual vehicle speed 84. Thus, if no valve failure modes are detected, the computer control will recognize the generation of a predetermined maximum number of dump pulses which has not corrected a slip condition as the illustrated spin and brake situation of FIG. 2e. After a predetermined number of maximum dump pulses have been applied to reduce the pressure to a level $B_2$, the control will then (at time $t_d$) enter a "spin and brake" reapply mode to generate a series of reapply pulses 82a to cause a first actual wheel speed departure cycle 80b. Also at this time, the control will reinitialize a new speed ramp 87 at the present vehicle speed. After generating the spin and brake reapply pulses 82a to increase the pressure to a level $B_3$, a series of dump pulses 83b are produced to reduce pressure to a level $B_4$ and correct the slip condition in the first wheel speed departure cycle. Next, one or more automatic reapply pulses 82b are generated to cause a second wheel speed departure cycle 80c and increase the pressure to a level $B_5$. Finally, a dump pulse 83b is generated to correct the slip condition in the second wheel speed departure 80c and reduce the pressure to a level $B_6$ for the remainder of the vehicle stop.

Figure 3A:
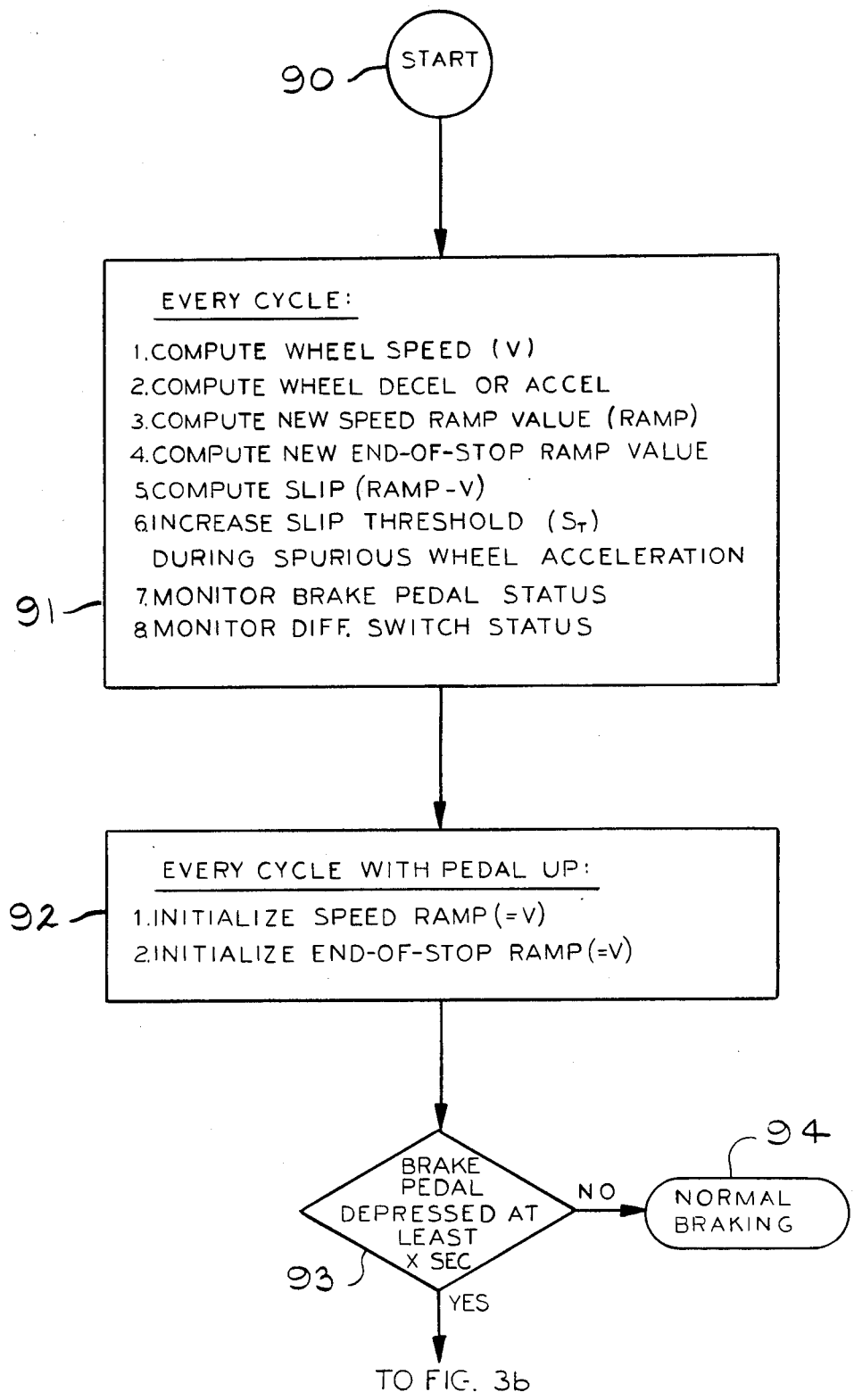
FIGS. 3a through 3c and FIGS. 4a and 4b are flow diagrams illustrating the manner in which anti-lock control system of FIG. 1 achieves the operating characteristics shown in FIGS. 2a through 2e.
Figure 3B:
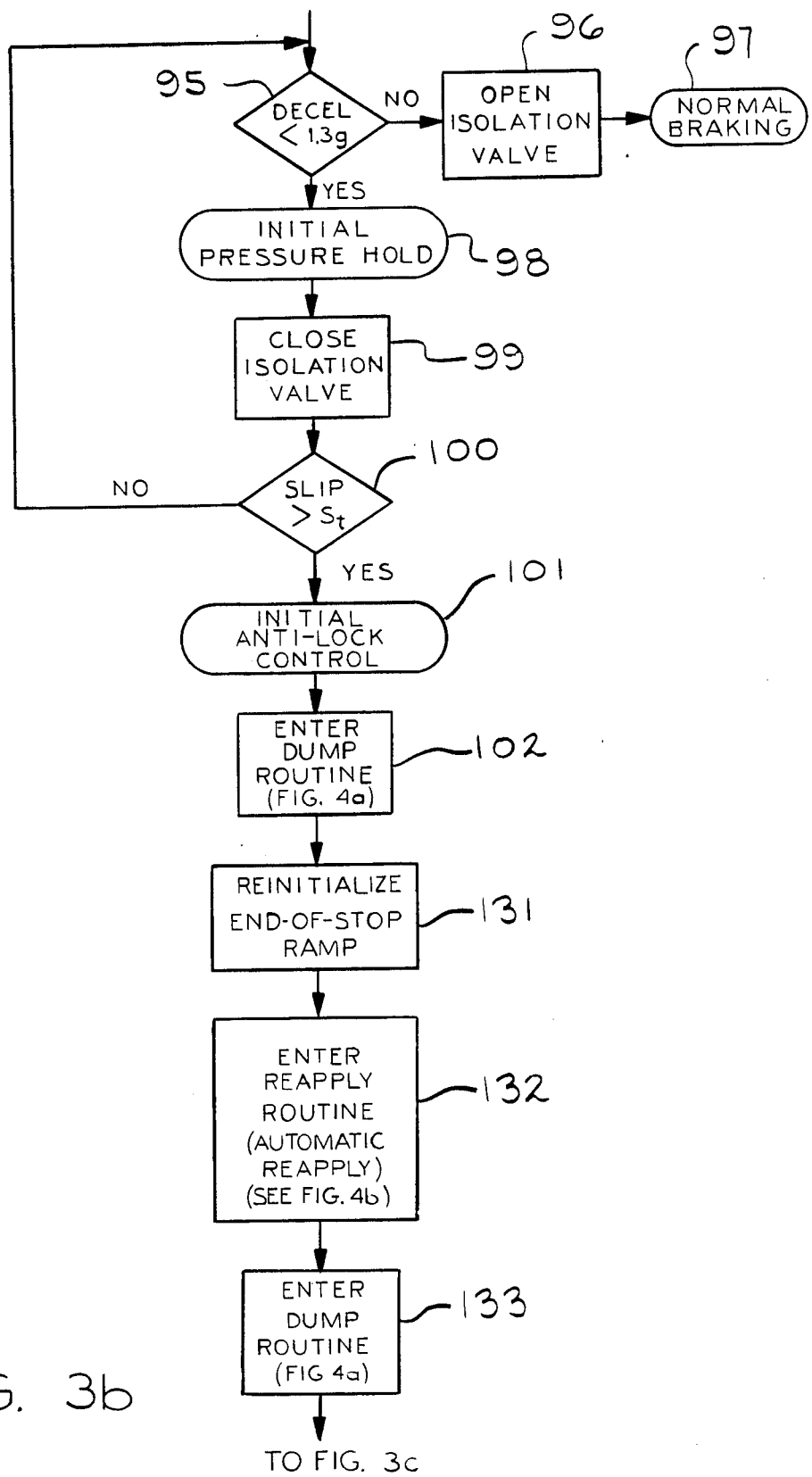
Figure 3C:
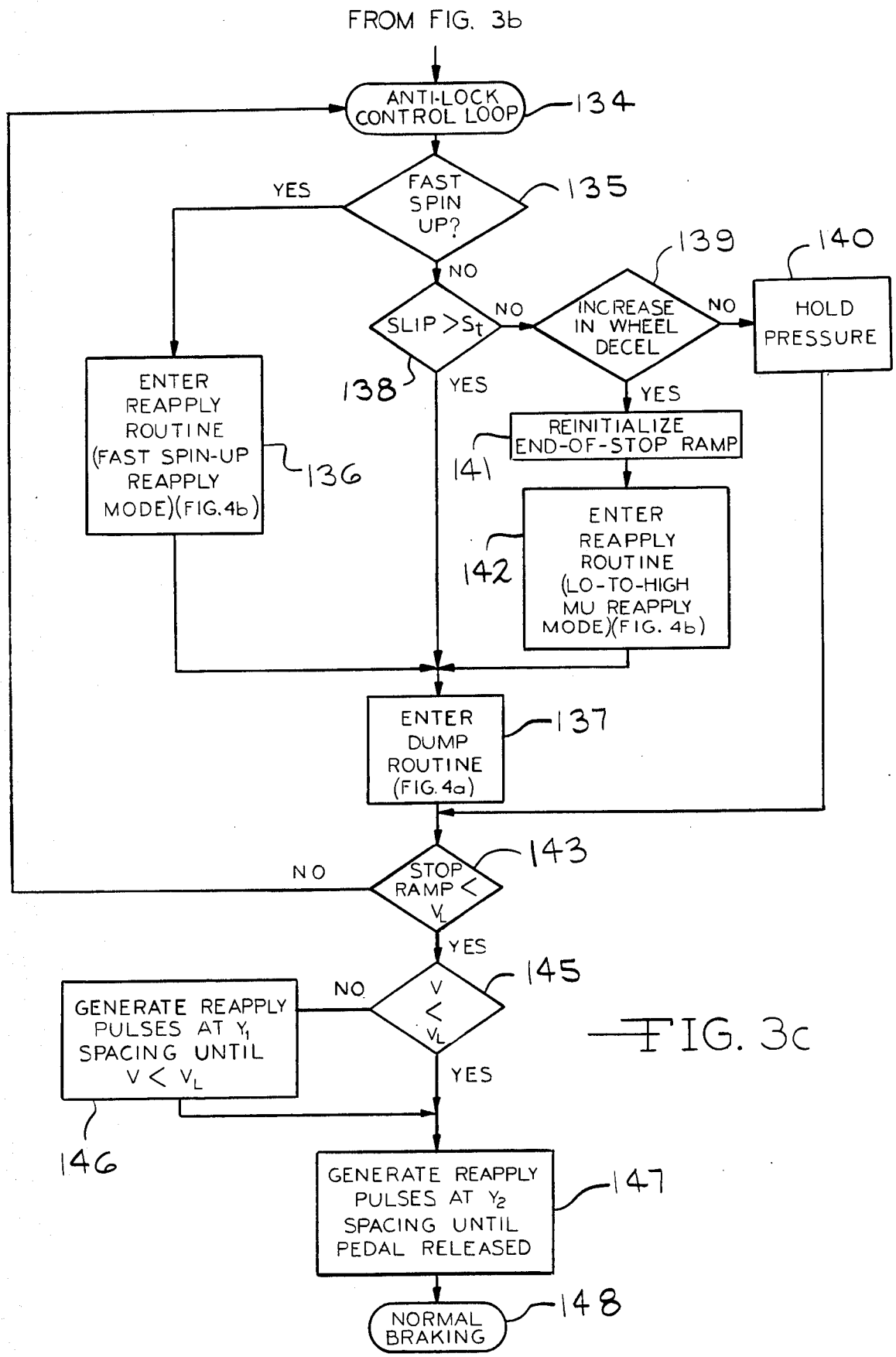

Referring now to FIGS. 3a through 3c and 4a and 4b, there is shown a simplified flow diagram illustrating the basic operation of the anti-lock control system of the present invention. These figures will be discussed with reference to the waveform diagrams of FIGS. 2a through 2e. The program is initiated in FIG. 3a at a circle 90 labeled "START" and then enters a processing function 91 wherein various operating parameters are computed and/or monitored. In FIG. 3a, eight separate computations and/or monitoring functions are performed during the processing function 91. The various computations and/or monitoring functions shown at 91 are continuously performed on a periodic basis during the operation of the vehicle, whether or not the brake system is operating in the anti-lock mode.

In particular, the processing function 91 computes (as operation #1) the actual speed (V) of the rear wheels as sensed by the speed sensor 40 of FIG. 1. As previously mentioned, since the speed sensor 40 is adapted to sense the rotational speed of the ring gear of the rear differential, the speed sensed is actually the average rotational speed between the left and right rear wheels. When the rear wheels are not slipping, the actual rear wheel speed is representative of the vehicle speed. Also, the computer control will compute (as operation #2) the present rear wheel deceleration (DECEL) or acceleration (ACCEL) over a last predetermined time period.

The computer control module then calculates (as operation #3) a new speed ramp value (RAMP) based on a previously calculated speed ramp value. The new speed ramp value represents the speed the wheels should be traveling at the present time if they were being decelerated at a predetermined maximum rate, for example, 1.0 g. If the new speed ramp value is less than the present rear wheel speed V, the ramp value is set equal to V. The computer also calculates (in operation #4) a new end-of-stop ramp value, based on a previously calculated end-of-stop ramp value. The new end-of-stop ramp value represents the speed the wheels should be traveling at the present time if they were being decelerated at a predetermined minimum rate on a low mu surface. Based on the new speed ramp value (RAMP) and the actual rear wheel speed (V) the computer control (in operation #5) can compute the actual wheel slip (SLIP) by subtracting the actual rear wheel speed from the ramp value. This SLIP value is later compared with a predetermined slip threshold $S_t$ to determine whether pressure reduction is required. The control further checks whether there is wheel acceleration and, during periods of spurious wheel acceleration, will temporarily increase the level of the standard slip threshold ($S_t$) for a predetermined time period.

In operations #7 and #8 of processing function 91, the computer control continues to monitor the status of the brake pedal 12 and the status of the pressure differential switch 44. In the event the brake pedal is released during an anti-lock control mode, the system will automatically return to a normal braking mode. Also, in the event the pressure differential switch contacts 44a have closed, indicating the isolation valve has closed to isolate pressure, and then have opened, indicating that the pressure supplied by the vehicle driver in the line is less than the rear wheel control pressure in the line 24, the anti-lock system will be released and the isolation valve will be opened. As previously mentioned, this indicates a situation wherein the driver has anticipated a rapid vehicle stop and has applied heavy brake pressure to cause the system to enter the anti-lock mode but, subsequently, has determined that the rapid vehicle stop is not necessary and has partially released the brake pedal without completely relieving all system pressure.

Next, the system enters a processing function 92 wherein, if the brake pedal is not depressed, the control will reinitialize both the speed ramp and the end of stop ramp by setting the initial value of each ramp equal to the present rear wheel speed V which, in this case, is assumed to represent the actual vehicle speed. Once the pedal is depressed, the new speed ramp and end-of-stop ramp values will be recalculated on a periodic basis in the processing function 91 based on the previously initialized or calculated value. Also, as will be discussed below, at several points in the anti-lock control mode, it is desirable to reinitialize either the speed ramp or the end-of-stop ramp values.

The program then enters a decision point at 93 to determine whether or not the brake pedal has been depressed for at least a predetermined time period. If not, the program branches at "NO" and enters or remains in a normal braking mode at 94. However, once the brake pedal has been depressed for the predetermined time period, the program branches at "YES" and enters a decision point at 95 (in FIG. 3b) to check the present rear wheel deceleration (DECEL). If the deceleration is less than a predetermined amount, for example, 1.3 g, the program branches at "NO" to a processing function 96 which generates a signal to open the isolation valve 22. The program then returns to a normal braking mode at 97. However, if the present rear wheel deceleration (DECEL) is greater than the predetermined amount, the system branches at "YES" to enter an "INITIAL PRESSURE HOLD" mode at 98, and then to a processing function 99 which generates a signal to initially close the isolation valve 22. Referring back to FIGS. 2a and 2c, the step of initially closing the isolation valve occurs at times $T_2$ and $t_2$, respectively, After the isolation valve has been closed, the program enters a decision point at 100 which checks the most recent rear wheel slip calculation with a predetermined slip threshold $S_t$. If the present wheel slip calculation does not exceed the predetermined threshold $S_t$, the program at "NO" and returns to the decision point 95 to again check the rear wheel deceleration. However, if the present rear wheel slip exceeds the predetermined slip threshold $S_t$, the program branches from the decision point 100 at "YES" to enter an "INITIAL ANTI-LOCK CONTROL" mode at 101. The initial anti-lock control mode first causes the system to enter a processing function 102 wherein a dump routine is entered to selectively reduce rear brake pressure. The dump routine is shown in more detail in FIG. 4a.

Figure 4A:
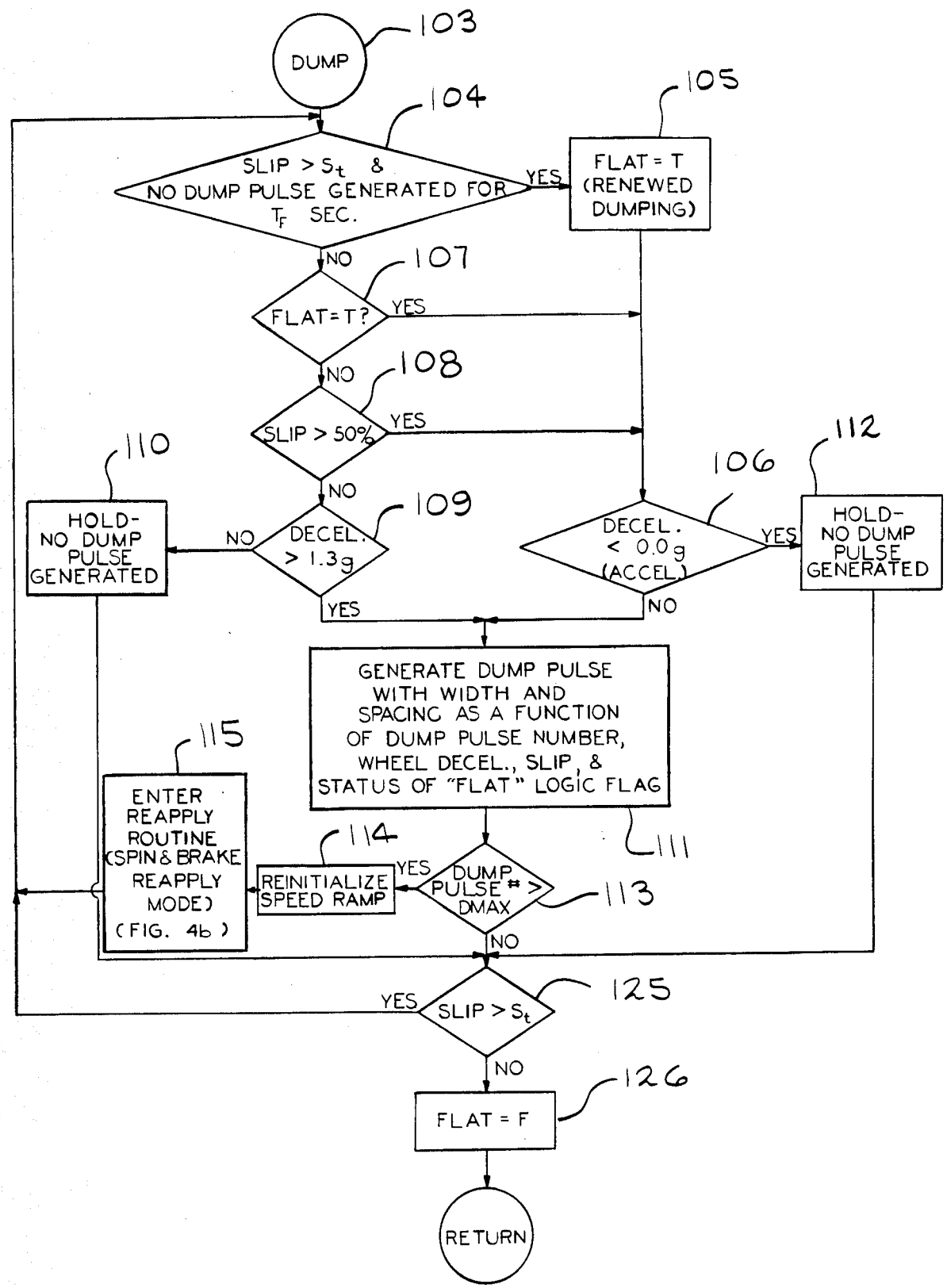

Referring now to FIG. 4a, the dump routine is initiated at a circle 103 labeled "DUMP" and first enters a decision point 104 in order to check the length of time the present wheel slip has exceeded the slip threshold $S_t$ and the length of time since the last dump pulse has been generated. As previously discussed with respect to the third rear wheel speed departure cycle 50f of FIG. 2a and the first wheel speed departure cycle 60a of FIG. 2c, it is desirable to determine after an initial dumping routine whether a wheel slip condition is in the process of being corrected. As previously mentioned, if the slip has continued to exceed the slip threshold $S_t$ and no dump pulse has been generated for a predetermined time period ($T_F$), it is desirable to enter a "renewed dumping" mode to generate further dump pulses to reduce the pressure and cause wheel spinup. If this renewed dumping is necessary, the program branches from the decision point 104 at "YES" and enters a processing function wherein a logic flag "FLAT" is set true (T). When true, the logic flag FLAT indicates that the system is in the renewed dumping mode. It should be noted that the flag is initially set false during the initial start up of the anti-lock program, such that the first time the dump routine is entered the flag will be false (F).

In the event the slip threshold $S_t$ has not been exceeded for the predetermined time period $T_F$, the program will branch from the decision point 104 at "NO" and check the status of the FLAT logic flag. If the flag is true, the program branches at "YES" to a decision point 106 to check whether the rear wheels are accelerating. If the flag is false, the program branches from the decision point 107 at "NO" and enters a decision point at 108 to check the degree of wheel slip. If the slip exceeds the slip threshold $S_t$ by 50 percent, the program branches from the decision point 108 at "YES" and enters the decision point 106 to check for rear wheel acceleration. If the slip is not greater than 50 percent of the slip threshold, the program branches from the decision point 108 at "NO" and enters a decision point 109 to check whether or not the wheel deceleration is greater than a predetermined amount, for example, 1.3 g. If not, the program branches from the decision point 109 at "NO" and enters a processing function 110 wherein no dump pulses are generated and the isolation valve remains closed to hold pressure to the rear wheels, thereby maintaining a relatively constant pressure to the rear brakes. If the wheel deceleration is greater than 1.3 g, the program will branch from the decision point 109 at "YES" to enter a processing function 111 which generates a dump pulse such as the dump pulses 53a of FIG. 2a or the dump pulses 63a of FIG. 2c to selectively reduce pressure to the rear brakes. The dump pulse is generated with a spacing which is a function of the particular number of dump pulses generated in the present dump cycle, the present value of wheel deceleration, the present wheel slip, and the status of the "FLAT" logic flag.

If the system is in a renewed dumping mode (FLAT=T), or the slip is greater than the slip threshold by more than 50 percent, the amount of wheel deceleration required in order to generate a dump pulse is reduced. In the preferred embodiment, it has been found desirable to generate a dump pulse providing the rear wheels are not accelerating, i.e., wheel deceleration is less than 0.0 g. In these instances, the program will branch from the decision point 106 at "NO" to enter the processing function 111. However, in the event there is rear wheel acceleration, the program will branch at "YES" and enter a processing function 112 wherein no dump pulse is generated and the isolation valve is kept closed, thereby holding pressure to the rear wheels at a constant level.

After the processing function 111 is performed, the program enters a decision point 113 to check the total number of dump pulses which have been generated in this particular dump routine. If the total number of dump pulses is greater than a predetermined amount (DMAX), this is an indication that either a system or valve failure has occurred, or that a "spin and brake" situation as discussed with respect to FIG. 2e is present. In this situation, if the program determines that no failure mode is present, the program branches from the decision point 113 at "YES" and enters a processing function 114 wherein the speed ramp is reinitialized, as shown at 87 in FIG. 2e. Next, a processing function 115 is entered and a reapply routine is performed to generated "spin and brake" reapply pulses such as the pulses 82a of FIG. 2e. The reapply routine is shown in more detail in FIG. 4b.

Figure 4B:
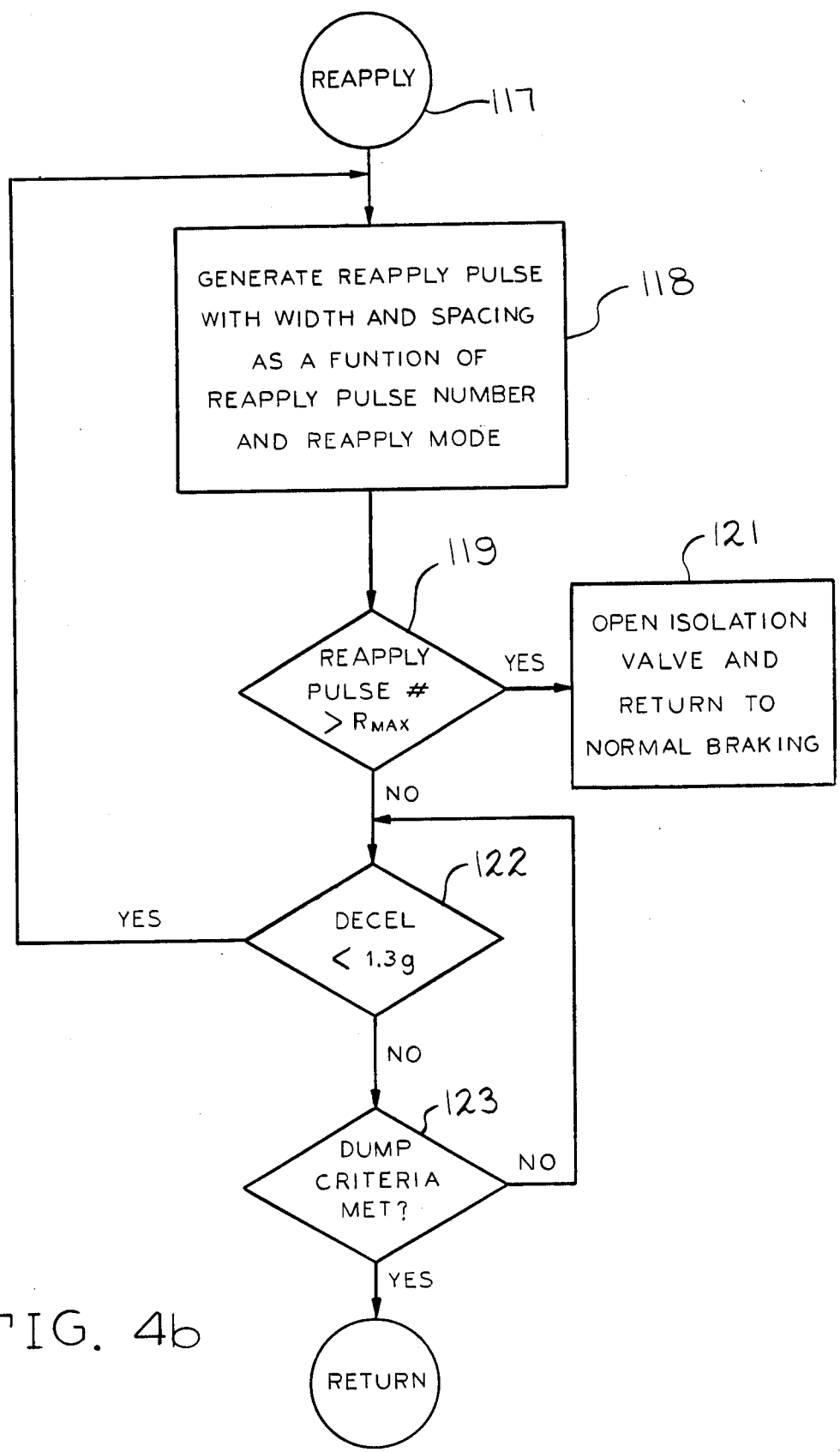

Referring temporarily to FIG. 4b, the reapply routine is initiated at a circle 117 labeled "REAPPLY" and then enters a processing function 118 for generating a reapply pulse to open the isolation valve 22 and selectively increase pressure to the rear wheels. The reapply pulse is generated with a width and spacing as a function of the particular number of reapply pulses generated in the present reapply routine, and the particular reapply mode which the system is in. Thus, if the reapply routine is entered from the processing function 115, which represents that the system is in the "spin and brake" reapply mode, the reapply pulse width and spacing will be selected accordingly. Following the processing function 118, the reapply program enters a decision point 119 to check the total number of reapply pulses which have been generated in this particular routine. If the total number of reapply pulses for the particular reapply routine has exceeded a predetermined number (RMAX), this indicates that after this many reapply pulses, the rear brakes should have received all of the fluid pressure that could be supplied by the vehicle driver. Thus, the program branches from the decision point 119 at "YES" to enter a processing function 121 which opens the isolation valve and returns the system to a normal braking mode. If the maximum of number reapply pulses have not been generated, the program branches from the decision point 119 at "NO" to a decision point 122 which checks the present rear wheel deceleration. If the rear wheel deceleration is less than 1.3 g, this is an indication that the additional reapply pulses should be generated and the program branches at "YES" back to the processing function 118. However, if the wheel deceleration is not less than 1.3 g, this is an indication that a sufficient number of reapply pulses have been generated to cause another wheel speed departure, and the program branches from the decision point 122 at "NO" and enters a decision point 123 to check whether the criteria for generating a dump pulse have been met. If this criteria has not been met, the program will return to the decision point 122 and again check the wheel deceleration. When sufficient reapply pulses have been generated to cause the system to branch from the decision point 123 at "YES", the system will return to the processing function 115 of FIG. 4a or other processing functions in the main program which have called the reapply routine. Once the "spin and brake" reapply pulses have been generated, the program is directed from the processing function 115 back up to the decision point 104 wherein the dump routine is reentered to correct the wheel speed departure initiated by the "spin and brake" reapply routine by generating dump pulses such as the dump pulses 83b of FIG. 2e.

In the event the number of dump pulses generated in the particular dump pulse routine is not greater than the predetermined number DMAX, the program will branch from the decision point 113 at "NO" and enter a decision point 125 to check whether or not the present wheel slip has exceeded the predetermined slip threshold $S_t$. The decision point 125 is also entered from the processing functions 110 and 112. If the present wheel slip is greater than the slip threshold $S_t$, the program branches from the decision point 125 at "YES" and returns to the beginning of the decision point 104 to again reenter the dump routine to check whether the criteria for generating another dump pulse have been met. However, if the rear wheel slip is less than $S_t$, indicating that the wheel speed departure has been corrected, the program branches from the decision point 125 at "NO" and enters a processing function 126 wherein the FLAT logic flag for renewed dumping is set false. From this point, the program will return to the main program.

Referring back to FIG. 3b, once the dump routine is performed by the processing function 102, the program enters a processing function 131 which reinitializes the end-of-stop ramp by setting the present stop ramp value to the present wheel speed. After the end-of-stop ramp has been initialized in processing function 131, the program enters a processing function 132 wherein the reapply routine of FIG. 4b is performed. More specifically, the processing function 132 is adopted to generate the automatic reapply pulses to cause a second wheel speed departure subsequent to the completion of the first wheel speed departure cycle. For example, pulses 52a of FIG. 2a, pulses 62a of FIG. 2c, pulses 72a of FIG. 2d, and pulses 82b of FIG. 2e are automatic reapply pulses which are generated to cause a second wheel speed departure. After the automatic reapply pulses have been generated by the processing function 132, the program enters a processing function 133 which calls the dump routine of FIG. 4a to selectively reduce pressure to the rear wheels and correct the slip condition of the second wheel speed departure cycle. In particular, the processing function 133 will generate dump pulse 53b of FIG. 2a, the dump pulse 63c of FIG. 2c, the dump pulse 73c of FIG. 2d, and the dump pulse 83c of FIG. 2e.

After the processing function 133 is performed, the brake pressure is generally set at the maximum allowable pressure under the present road surface conditions. If the road surface conditions under which the anti-lock system was entered remain the same and the driver continues to apply excess pressure to the brake pedal, the pressure to the rear brakes will be held at this constant controlled level until the remainder of the vehicle stop. However, in some instances the road surface conditions will change. The present program is designed to continuously monitor various parameters which are indicative of changes in road surface friction and which may require a change in the controlled pressure to the rear wheels. Following the processing function 133, the program enters an "ANTI-LOCK CONTROL LOOP" at 134 (FIG. 3c) in which various operating parameters are monitored to detect changes in road surface conditions throughout the remainder of the stop. The program first enters a decision point 135 to check whether a fast spin-up situation has occurred. As previously discussed with respect to FIG. 2d, in some situations, a low-to-high mu surface change may occur during the second wheel speed departure cycle, which occurs as a result of processing functions 132 and 133. In this case, the low-to-high mu surface change will result in a fast spin-up portion at the end of the second wheel speed departure cycle. This fast spin-up portion can be detected by monitoring whether, after the slip condition is corrected, the rear wheel acceleration continues to exceed a predetermined rate for a predetermined time period $T_s$, shown in FIG. 2d. In this situation, the program will branch from the decision point 135 at "YES" and enter a processing function 136 wherein the reapply routine of FIG. 4b is executed to generate the "fast spin-up" reapply pulses, such as the pulses 72b shown in FIG. 2d, and cause a third wheel speed departure. After the generation of the fast spin-up reapply pulses, the program enters a processing function 137 to generate dump pulses such as the dump pulse 73d of FIG. 2d to correct the wheel slip condition caused by the fast spin-up reapply pulses.

Referring back to the decision point 135, if a fast spin-up situation has not been detected, the program branches from the decision point 135 at "NO" and enters a decision point 138 to check the present rear wheel slip. When the rear wheel slip begins to occur following the second wheel speed departure cycle, this indicates a situation as shown in FIG. 2a wherein the vehicle has initially entered the anti-lock mode and stabilized the rear brake pressure while on a high mu surface and, subsequent to the second wheel speed departure cycle, has traveled onto a low mu surface such that the controlled rear wheel brake pressure is sufficiently high to cause a third wheel speed departure cycle, shown in FIG. 2a at 50f. In these instances, the program branches from the decision point 138 at "YES" and enters the processing function 137 to selectively dump pressure by generating the dump pulses such as the dump pulses 53c of FIG. 2a. Also, while executing the dump routine of FIG. 4a, it may be necessary to generate the renewed dumping pulses 53d as shown in FIG. 2a.

Referring back to the decision point 138, if the present rear wheel slip does not exceed the slip threshold $S_t$, the program branches at "NO" and enters a decision point 139 to check whether there has been a predetermined increase in wheel deceleration. Such a check will detect a situation as shown in FIG. 2c wherein braking of the vehicle has been initiated and the anti-lock mode has been entered on a low mu surface and, subsequently, the vehicle travels onto a high mu surface. As previously mentioned, in this situation, additional pressure can typically be applied to the rear brakes to increase the braking of the vehicle. The program first branches from the decision point 139 at "YES" and enters a processing function 141 wherein the end-of-stop time ramp is reinitialized. Next, the program enters a processing function 142 which executes the reapply routine of FIG. 4b to generate the "low-to-high" reapply pulses such as the pulses 62b shown in FIG. 2c. As previously mentioned, the low-to-high reapply pulses are generated to cause a wheel speed departure such as the wheel speed departure cycle 60c of FIG. 2c. From the processing function 142, the program enters the processing function 137 and executes the dump routine to selectively reduce the controlled rear pressure by generating one or more dump pulses such as the dump pulse 63d of FIG. 2c.

Following the execution of the processing function 137, the program enters a decision point 143 to check whether the current value of the end-to-stop speed ramp is less than a predetermined low speed limit ($V_L$). If the end-of-stop ramp value is not less than the low speed limit ($V_L$), the program branches at "NO" and returns to the anti-lock control loop at 134. If the present end-of-stop ramp value is less than the low speed limit, the program branches from the decision point 143 at "YES" and enters a decision point 145 to check whether the present rear wheel speed (V) is less than the low speed limit ($V_L$). If the present rear wheel speed is not less than the vehicle low speed limit ($V_L$), the program branches from the decision point 145 at a "NO" and enters a processing function 146 wherein end-of-stop reapply pulses are generated at a predetermined spacing ($Y_1$) to increase the controlled pressure to the rear brakes. The reapply pulses generated by the processing function 146 correspond to the pulses 52b shown in FIG. 2a.

Once the rear wheel speed falls below the low speed limit, the program branches from the decision point 145 at "YES", or from the processing function 146 to a processing function 147 wherein reapply pulses are generated at a spacing (Y$_2$) until the brake pedal is released. The reapply pulses generated by the processing functions 147 correspond to either the pulses 52c of FIG. 2a or the pulses 62c of FIG. 2c. Typically, the spacing Y$_2$ is greater than the spacing Y$_1$. As previously discussed, the end-of-stop reapply pulses prevent engine high idle torque from causing rear wheel spin when the vehicle is at or near the end of a stop on a relatively low mu surface. Once the brake pedal is released, the system then enters a normal braking mode at 148.

The anti-lock control system of the present invention has been illustrated and described in a manner which is considered to represent its preferred embodiment. However, it will be appreciated that the features and operation of the present invention can be modified without departing from the spirit or scope of the attached claims. For example, while the control system has been described for use in conjunction with a pumpless anti-lock brake system for controlling only the rear wheels of a vehicle, the above described operating features or portions thereof can be incorporated into an anti-lock system which includes a hydraulic pump and is adapted to control the brake pressure to all four wheels of the vehicle.

What is claimed is:

1. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:
    a normally open isolation valve means connected between the supply means and the selected wheel brake;
    a normally closed dump valve means connected between the selected wheel brake and a fluid reservoir; and
    control means connected to operate said isolation valve means and said dump valve means, said control means including means for detecting wheel speed departures of the associated wheel relative to the actual speed of the vehicle, said control means operable to close said isolation valve means to hold the fluid pressure to the selected wheel brake at a relatively constant level after a first wheel speed departure of the associated wheel is detected, said control means operable to selectively open said dump valve means after said isolation valve means has been closed to enable fluid to flow into said fluid reservoir to selectively reduce fluid pressure to the selected wheel brake to a first predetermined pressure and correct said first wheel speed departure, said control means further operable to selectively open said isolation valve to selectively increase pressure to the wheel brake to cause a second wheel speed departure after said first wheel speed departure has been corrected, said control means operable to selectively open said dump valve means after said second wheel speed departure has been detected to selectively reduced pressure to the selected wheel brake to a second predetermined pressure greater than said first predetermined pressure.

2. The control system according to claim 1 wherein said control means includes means for sensing deceleration of the vehicle, said control means being operable to selectively open said isolation valve means to selectively increase pressure to the wheel brake to cause a third wheel speed departure after said second wheel speed departure has been corrected and the increase in deceleration of the vehicle has exceeded a predetermined amount, said control means operable to selectively open said dump valve means after said third wheel speed departure has been detected to selectively reduce pressure to the selected wheel brake to a third predetermined pressure.

3. The control system according to claim 2 wherein said third predetermined pressure is greater than said second predetermined pressure.

4. The control system according to claim 1 wherein said control means includes means for determining when the vehicle has approached an end-of-stop condition and for automatically operating said isolation valve means to apply and maintain additional pressure to the selected wheel brake when the vehicle is in said end-of-stop condition.

5. The control system according to claim 1 wherein said control means includes means for sensing the acceleration of the associated wheel during spin-up portions of said wheel speed departures, said control means being operable to selectively open said isolation valve means to selectively increase pressure to the selected wheel brake to cause a further wheel speed departure after a previous wheel speed departure has been corrected and the acceleration of the associated wheel during a spin-up portion of said previous wheel speed departure exceeds a predetermined rate.

6. The control system according to claim 5 wherein said previous wheel speed departure is said second wheel speed departure and said further wheel speed departure is a third wheel speed departure.

7. The control system according to claim 5 wherein said control means is operable to selectively open said dump valve means after said further wheel departure has been detected to selectively reduce pressure to the selected wheel brake to a third predetermined pressure.

8. The control system according to claim 7 wherein said third predetermined pressure is greater than said second predetermined pressure.

9. The control system according to claim 1 wherein said control means includes means for monitoring the time said dump valve means has been open after said first wheel speed departure has been detected and prior to correction of said first wheel speed departure, said control means operable to selectively open said isolation valve means to increase pressure to the selected wheel brake after said dump valve means has been open during said first wheel speed departure for a predetermined time period.

10. The control system according to claim 9 wherein, when said first wheel speed departure is detected, the speed of the associated wheel is greater than the speed of the vehicle.

11. The control means according to claim 1 wherein said control means includes means for sensing the deceleration of the associated wheel and is operable to initially open said dump valve during one of said wheel departures for a first dumping cycle until the deceleration of the associated wheel is less than a first predetermined amount to reduce pressure, said control means further operable to reopen said dump valve means for a second renewed dumping cycle to further reduce pressure when the deceleration of the associated wheel is greater than a second predetermined amount which is less than said first predetermined amount and an impending lock-up condition of the associated wheel has continued for a predetermined time period after said first dumping cycle is terminated.

12. The control system according to claim 1 wherein said vehicle includes front and rear wheel brakes and said control system controls the application of pressurized brake fluid only to said rear wheel brakes.

13. The control system according to claim 1 wherein said normally open isolation valve means includes first solenoid means for selectively closing said isolation valve, and said normally closed dump valve means includes second solenoid means for selectively opening said dump valve.

14. The control system according to claim 1 wherein said control means includes means coupled to monitor the speed of the associated wheel for generating a wheel speed signal, means responsive to said wheel speed signal for generating a speed ramp signal representing the speed the vehicle would travel if decelerated at a predetermined rate, and means for generating a slip signal when the difference between said speed ramp signal and said wheel speed signal exceeds a predetermined slip threshold.

15. The control system according to claim 14 wherein said control means includes means responsive to said slip signal for generating a dump signal to open said dump valve means to selectively reduce pressure to the selected wheel brake.

16. The control system according to claim 15 wherein said dump signal includes a series of dump pulses each having a width representing the time the dump valve means remains open.

17. The control system according to claim 16 including means for varying the width of said dump pulses.

18. The control system according to claim 17 including means for varying the spacing between successive dump pulses.

19. The control system according to claim 14 wherein said control means includes means for generating a no slip signal when the difference between said speed ramp signal and said wheel speed signal is less than said predetermined slip threshold.

20. The control system according to claim 19 wherein said control means includes means responsive to said no slip signal for generating an apply signal to selectively open said isolation valve to increase pressure to the selected wheel brake.

21. The control system according to claim 20 wherein said apply signal includes a series of apply pulses each having a width representing the time the isolation valve means remains open.

22. The control system according to claim 21 including means for varying the width of said apply pulses.

23. The control system according to claim 22 including means for varying the spacing between successive apply pulses.

24. The control system according to claim 14 wherein said control means includes means for increasing said slip threshold for a predetermined time period when wheel speed oscillations are detected.

25. The control system according to claim 1 wherein said isolation valve means includes an inlet coupled to the supply means and an outlet coupled to the selected wheel brake, said control means including means for monitoring the differential pressure across said isolation valve means and for generating a pressure differential signal when said isolation valve means is closed and the pressure at said outlet is greater than the pressure at said inlet, said control means responsive to said pressure differential signal for opening said isolation valve means.

26. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:
  valve means connected between the supply means and the selected wheel brake;
  control means connected to operate said valve means for selectively controlling the application of pressure to the associated wheel brake to prevent lock-up of the associated wheel;
  said control means including means for generating an end-of-stop speed ramp representing the speed of the vehicle as the vehicle is decelerated at a predetermined deceleration rate and for automatically operating said valve means to apply and maintain additional pressure to the associated wheel brake when the level of said end-of-stop speed ramp falls below a predetermined speed.

27. The control system according to claim 26 wherein said vehicle includes front and rear wheel brakes and said control system controls the application of pressurized brake fluid only to said rear wheel brakes.

28. The control system according to claim 26 wherein said associated wheel is a driven wheel of the vehicle and said additional pressure is supplied at a level which prevents any rotation of said associated wheel after the vehicle has come to a complete stop.

29. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:
  a normally open isolation valve means connected between the supply means and the selected wheel brake;
  a normally closed dump valve means connected between the selected wheel brake and a fluid reservoir; and
  control means connected to operate said isolation valve means and said dump valve means, said control means including means for detecting an impending wheel lock-up condition of the associated wheel and means for sensing the deceleration of the associated wheel, said control means operable to close said isolation valve means to hold the fluid pressure to the selected wheel brake at a relatively constant first predetermined pressure after said impending wheel lock-up condition of the associated wheel is detected, said control means operable to selectively open said dump valve means for a first dumping cycle after said isolation valve means is closed and the deceleration of the selected wheel exceeds a first predetermined amount of enable fluid to flow into said fluid reservoir to selectively reduce fluid pressure to the selected wheel brake until the deceleration of the associated wheel is less than said first predetermined amount, said control means further operable to selectively reopen said dump valve means for a second renewed dumping cycle to further reduce fluid pressure to the selected wheel brake when the deceleration of the associated wheel is greater than a second predetermined amount less than said first predetermined amount and said impending lock-up condition of the associated wheel has continued for a predetermined time period after said first dumping cycle is terminated.

30. The control system according to claim 29 wherein said vehicle includes front and rear wheel brakes and said control system controls the application of pressurized brake fluid only to said rear wheel brakes.

31. The control system according to claim 29 wherein said control means includes means for generating a wheel speed signal representing the speed of the associated wheel and means for generating a speed ramp signal representing the speed of the vehicle if decelerated at a predetermined rate, said control means operable to generate a slip signal when the difference between said speed ramp signal and said wheel speed signal exceeds a predetermined slip threshold.

32. The control means according to claim 31 wherein said second renewed dumping cycle is performed only when said slip signal has been generated during said predetermined time period.

33. The control system according to claim 29 wherein said second predetermined amount is 0.0 g.

34. The control system according to claim 33 wherein said first predetermined amount is greater than or equal to 1.0 g.

35. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:
a normally open isolation valve means connected between the supply means and the selected wheel brake;
a normally closed dump valve means connected between the selected wheel brake and a fluid reservoir; and
control means connected to operate said isolation valve means and said dump valve means, said control means including means for detecting wheel speed departures of the associated wheel and means for sensing the acceleration of the associated wheel during spin-up portions of said wheel speed departures, said control means operable to close said isolation valve means to hold the fluid pressure to the selected wheel brake at a relatively constant level after a first wheel speed departure of the associated wheel is detected, said control means operable to selectively open said dump valve means after said isolation valve means has been closed to enable fluid to flow into said fluid reservoir to selectively reduce pressure to the selected wheel brake and correct said first wheel speed departure of the associated wheel, said control means further operable to selectively open said isolation valve means to selectively increase pressure to the selected wheel brake to cause a second wheel speed departure after said wheel first wheel speed departure has been corrected and the acceleration of the associated wheel during a spin-up portion of said first wheel speed departure exceeds a predetermined rate.

36. The control system according to claim 35 wherein said vehicle includes front and rear wheel brakes and said control system controls the application of pressurized brake fluid only to said rear wheel brakes.

37. The control system according to claim 35 wherein said control means includes means for generating a wheel speed signal representing the speed of the associated wheel and means for generating a speed ramp signal representing the speed of the vehicle if decelerated at a predetermined rate, said control means operable to generate a no slip signal when the difference between said speed ramp signal and said wheel speed signal exceeds a predetermined slip threshold.

38. The control system according to claim 37 wherein said control means is operable to cause said second wheel speed departure only if the acceleration of the associated wheel exceeds said predetermined rate for a certain time period when said no slip signal is being generated.

39. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:
a normally open isolation valve means connected between the supply means and the selected wheel brake;
a normally closed dump valve means connected between the selected wheel brake and a fluid reservoir; and
control means connected to operate said isolation valve means and said dump valve means, said control means including means for detecting a wheel lock-up condition of the associated wheel, said control means including means for detecting a wheel lock-up condition of the associated wheel, said control means operable to close said isolation valve means to hold the fluid pressure to the selected wheel brake at a relatively constant level after said wheel lock-up condition of the associated wheel is detected, said control means operable to selectively open said dump valve means during a dump cycle after said wheel lock-up condition has been detected to enable fluid to flow into said fluid reservoir to selectively reduce pressure to the selected wheel brake and correct the lock-up condition of the associated wheel, said control means including means for monitoring the time said dump valve means has been open during said dump cycle, said control means further operable to selectively open said isolation valve means to increase pressure to the selected wheel brake to cause a wheel speed departure of the associated wheel after said dump cycle when the total time said dump valve has been open during said dump cycle exceeds a predetermined amount, said control means further operable to selectively open said dump valve means after said increase in pressure to enable fluid to flow into said fluid reservoir to selectively reduce pressure to the selected wheel brake and correct said wheel speed departure.

40. The control system according to claim 39 wherein said vehicle includes front and rear wheel brakes and said control system controls the application of pressurized brake fluid only to said rear wheel brakes.

41. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:

- a normally open isolation valve means connected between the supply means and the selected wheel brake;
- a normally closed dump valve means connected between the selected wheel brake and a fluid reservoir; and
- control means connected to operate said isolation valve means and said dump valve means, said control means including means for detecting wheel speed departures of the associated wheel and means for sensing the deceleration of the associated wheel, said control means operable to close said isolation valve means to hold the fluid pressure to the selected wheel brake at a relatively constant level after a first wheel speed departure of the associated wheel is detected, said control means operable to selectively open said dump valve means after said isolation valve means has been closed to enable fluid to flow into said fluid reservoir to selectively reduce pressure to the selected wheel brake to a first predetermined pressure and correct said first wheel speed departure, said control means further operable to selectively open said isolation valve means to increase pressure to the selected wheel brake when the deceleration of the vehicle increases by a predetermined amount to cause a second wheel speed departure after said first wheel speed departure has been corrected, said control means operable to selectively open said dump valve means after said second wheel speed departure has been detected to selectively reduce pressure to the selected wheel brake to a second predetermined pressure greater than said first predetermined pressure.

* * * * *